(12) United States Patent
Tako et al.

(10) Patent No.: US 6,182,706 B1
(45) Date of Patent: Feb. 6, 2001

(54) PIPING JACKET

(75) Inventors: Anthony Tako, Long Grove, IL (US);
Walter William Lenox, Lakewood, CO (US)

(73) Assignee: A. J. Gerrard & Company, Des Plaines, IL (US)

( * ) Notice: Under 35 U.S.C. 154(b), the term of this patent shall be extended for 0 days.

(21) Appl. No.: 09/413,646

(22) Filed: Oct. 6, 1999

(51) Int. Cl.[7] ........................................ F16L 9/00
(52) U.S. Cl. .................. 138/156; 138/168; 138/151; 138/166
(58) Field of Search ..................... 138/156, 166–168, 138/151

(56) References Cited

U.S. PATENT DOCUMENTS

| | | | | |
|---|---|---|---|---|
| 663,386 | * | 12/1900 | Hobbs | 138/167 X |
| 940,927 | * | 11/1909 | Graham | 138/167 |
| 2,012,889 | | 8/1935 | McIntyre | 29/156 |
| 2,825,673 | | 3/1958 | Tschappu | 154/44 |
| 3,078,880 | | 2/1963 | Stephens | 138/141 |
| 3,413,406 | * | 11/1968 | Plummer | 138/167 X |
| 3,495,629 | | 2/1970 | Botsolas et al. | 138/149 |
| 3,559,694 | | 2/1971 | Volberg | 138/147 |
| 4,243,453 | | 1/1981 | McClintock | 138/149 X |
| 4,442,153 | * | 4/1984 | Meltsch | 138/167 X |
| 4,442,155 | * | 4/1984 | Foertsch et al. | 138/167 X |
| 4,478,252 | | 10/1984 | McLoughlin | 138/140 |
| 4,627,469 | | 12/1986 | Buard | 138/92 |
| 4,838,318 | | 6/1989 | Karakawa | 138/166 |
| 4,840,201 | | 6/1989 | Botsolas | 138/178 |
| 4,850,397 | | 7/1989 | Grenier | 138/149 |
| 6,032,702 | * | 3/2000 | Bearden | 138/167 X |

\* cited by examiner

*Primary Examiner*—Patrick Brinson
(74) *Attorney, Agent, or Firm*—Pauley Petersen Kinne & Fejer

(57) ABSTRACT

A piping jacket for insulating a piping element to prevent heat transfer and to protect the piping element from moisture and other elements. The piping jacket has a first edge portion with a curved edge and a second edge portion with a plurality of projections that interfere with the curved edge to secure the piping jacket around a piping element when the piping jacket is in a closed position. The piping jacket can have two or more rows of projections along the second edge portion to accommodate piping elements having different outer diameters. The piping jacket can also be formed by two separate body sections positioned around a piping element and pressed together so that projections along a first edge portion and a second edge portion of the inner body section interfere with the curved edges of a first edge portion and a second edge portion of the outer body section.

18 Claims, 3 Drawing Sheets

PIPING JACKET

BACKGROUND OF THE INVENTION

1. Field of the Invention

This invention relates to a piping jacket having two edge portions. A first edge portion forms a curved edge and a second edge portion forms a plurality of projections. When the piping jacket is positioned around a piping element, the projections of the second edge portion interfere with the curved edge of the first edge portion to temporarily secure the piping jacket around a piping element.

2. Description of Related Art

Conventional piping covers generally are limited in their uses to particular sizes, shapes and configurations of piping elements. Further, some conventional piping covers are difficult to position and/or secure around a piping element. Piping elements are often first covered with a conventional insulation then the piping jacket is secured around the insulation and thus the piping element. The piping jacket normally does not contact the insulated piping element.

Conventional piping jackets use several different fastening devices to secure a piping jacket around a piping element. For example, U.S. Pat. No. 4,478,252 discloses a device for enclosing a "T" joint with one side of a body having a row of hollow protuberances and the other side of the body having a row of corresponding protuberances of a slightly smaller dimension. The body is positioned around a pipe fitting so that the rows of protuberances are aligned. The device is then heated with a gas torch to heat shrink the device around the pipe fitting.

U.S. Pat. No. 4,840,201 discloses a pipe cover that has two sections with side seams that form a groove and a lip extending from the groove. The two sections are positioned around a piping element and pressed together so that the side seams interlock over the pipe fitting. An adhesive is then applied within the grooves formed by the side seams to secure the pipe cover around the piping element.

U.S. Pat. No. 3,559,694 discloses a removable insulation unit having two outer sections with a layer of insulation material along an inside surface of each section. A series of matching retaining members are spaced along an outer surface of the sections to secure the sections around a pipe.

It is apparent from the conventional pipe fitting covers that there is a need for a piping jacket that is easy to position and temporarily secure around a piping element. It is also apparent that there is a need for a piping jacket that can easily accommodate piping elements having different outer diameters, lengths and configurations.

SUMMARY OF THE INVENTION

It is one object of this invention to provide a piping jacket that is easy to position and temporarily secure around a piping element, so that one person can temporarily position and then permanently secure the piping jacket with respect to the piping element.

It is another object of this invention to provide a non-perforated piping jacket to insulate a piping element to reduce heat transfer and to protect the piping element from moisture and other elements.

It is another object of this invention to provide a piping jacket that has a curved edge on one edge portion and a plurality of projections on a second edge portion wherein the projections interfere with the curved edge to temporarily secure the piping jacket around a piping element.

It is still another object of this invention to provide a piping jacket having a plurality of projections along the second edge portion that form at least two rows of projections, to accommodate piping elements of different outer diameters.

It is yet another object of this invention to provide a piping jacket having two separate sections, wherein one section has a first edge portion and a second edge portion, each portion having a plurality of projections that interfere with a curved edge of a first edge portion and a curved edge of a second edge portion, respectively, of the second section.

The above and other objects of this invention are accomplished with a piping jacket that is moveable between an open position wherein a first edge portion and a second edge portion of the piping jacket are spaced apart from each other, and a closed position wherein the first edge portion contacts and overlaps the second edge portion. At least a portion of the first edge portion has a curved edge which preferably but not necessarily curves radially inward. The second edge portion has or forms a plurality of projections, such as dimples, which interfere with the first edge portion, when the piping jacket is in a closed position, to temporarily secure the piping jacket around the piping element. The piping jacket is then permanently fastened using a clamp, a strap or any other conventional permanent fastening means. With the piping jacket according to this invention, one person can install and permanently secure the piping jacket.

In one preferred embodiment of this invention, the projections are directed radially outward with respect to a body of the piping jacket and are formed in a non-perforated manner so that no part of the body is pierced at or near each projection. Preferably but not necessarily, the projections have a triangular two-dimensional shape within a plane that is generally parallel to an outer surface of the second edge portion. The projections are preferably shaped and positioned so that bearing surfaces of the projections are aligned to form a retaining line along the second edge portion of the piping jacket. The selected shape and dimensions of the bearing surface establish area contact or line contact between the first curved edge and the bearing surface. Thus, contact at the bearing surfaces retains the curved edge along the retaining line, temporarily securing the piping jacket around the piping element.

In one preferred embodiment according to this invention, the second edge portion of the piping jacket may comprise at least two rows of projections to form at least two retaining lines, so that one piping jacket can accommodate piping elements of different outer diameters. The projections of the second row may be a different size and/or shape from the projections of the first row, and may be aligned circumferentially with or offset from the projections in the first row.

In one preferred embodiment according to this invention, the body of the piping jacket is formed by two separate body sections. Each body section has a first edge portion and a second edge portion having a plurality of projections and a curved edge, respectively. In such an embodiment, with the body in the closed position the first edge portion of one body section is positioned radially inward from and overlaps the first edge portion of the second body section. Similarly, the second edge portion of the first body section is positioned radially inward from and overlaps the second edge portion of the second body section. By pushing or otherwise forcing the body sections together or towards each other, the curved edges on the first edge portion and the second edge portion of the outer body section interfere with the projections of the first edge portion and the second edge portion of the inner body section to temporarily secure the piping jacket around the piping element.

BRIEF DESCRIPTION OF THE DRAWINGS

The drawings show different features of a piping jacket according to preferred embodiments of this invention, wherein.

DETAILED DESCRIPTION OF PREFERRED EMBODIMENTS

A piping jacket 10 according to this invention can be used to cover and insulate a pipe or piping to prevent heat transfer or to protect the pipe or piping from moisture and other elements. Piping includes, for example, straight runs or sections of piping, pipe fittings, elbow joints and "T" joints, and as used throughout this specification and in the claims, the term "piping element" is intended to mean or relate to a pipe or piping. It is apparent that piping jacket 10 according to this invention can accommodate a piping element having a range of outer diameters, lengths and configurations.

Figure 1:
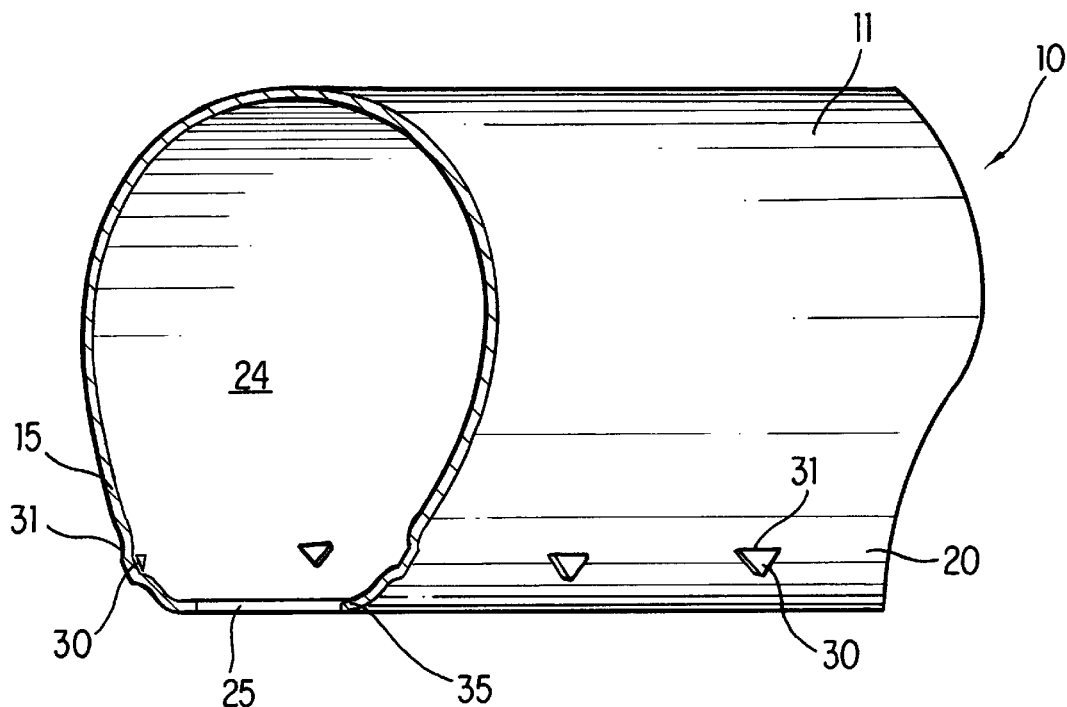
FIG. 1 is a perspective front view of a piping jacket in an open position, according to one preferred embodiment of this invention.

Piping jacket 10, according to preferred embodiments of this invention, comprises a body 11. Body 11 may be constructed of stainless steel, aluminum, metal and/or any suitable non-metal material. Body 11 can have different dimensions to form different sizes of an opening 24 to accommodate a range of suitably sized piping elements. As shown in FIG. 1, body 11 comprises a first edge portion 15 and an opposing second edge portion 20. By pulling or otherwise forcing first edge portion 15 away from second edge portion 20, body 11 is moveable to an open position, as shown in FIG. 1, wherein opening 24 expands to accommodate a piping element. Once piping jacket 10 is positioned properly around the piping element, body 11 is moved to a closed position by forcing first edge portion 15 toward second edge portion 20 until first edge portion 15 contacts and overlaps second edge portion 20, such as shown in FIG. 2.

As shown in FIGS. 1–5, at least a portion of first edge portion 15 has a first curved edge 25. First curved edge 25 preferably, but not necessarily, curves radially inward with respect to body 11. In the closed position, first curved edge 25 of first edge portion 15 interferes with a plurality of projections 30 on second edge portion 20.

As shown in FIGS. 1–5, second edge portion 20 has or forms a plurality of projections 30, such as dimples. Projections 30 and/or first curved edge 25 stiffen and thus increase a longitudinal or axial strength of piping jacket 10. Each projection 30 is preferably directed radially outward with respect to body 11 to interfere with first curved edge 25, which is preferably directed radially inward when body 11 is in the closed position. As shown in the preferred embodiments of FIGS. 1–5, body 11 is non-perforated. No part of body 11 is pierced at, near or in the vicinity of each projection 30, and thus no open void is formed within body 11. Body 11 is preferably non-perforated or has no voids when used in certain applications, such as where moisture or other environmental elements can enter piping jacket 10.

Figure 2:
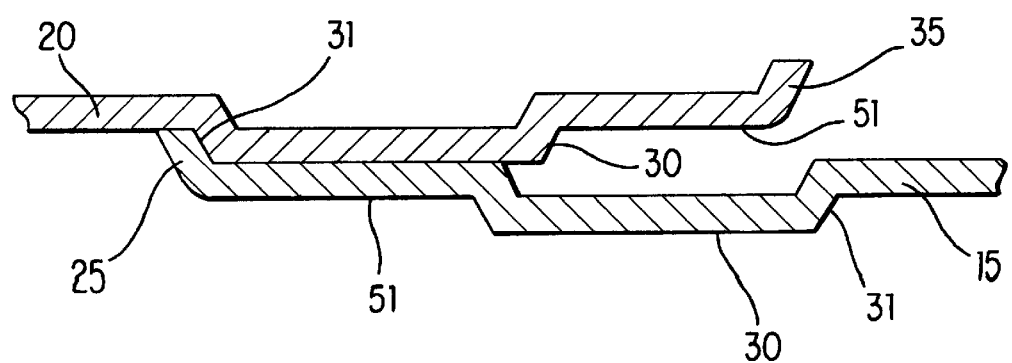
FIG. 2 is an enlarged partial cross-sectional view showing a portion of a piping jacket in a closed position and a first curved edge contacting a bearing surface of a projection, according to one preferred embodiment of this invention.

In one preferred embodiment of this invention, each projection 30 has a triangular or approximately triangular two-dimensional shape within a plane that is generally parallel to an outer surface 51 of first edge portion 15 and/or second edge portion 20, as shown in FIG. 2. In such preferred embodiment, projections 30 are preferably shaped and positioned so that bearing surfaces 31 of projections 30 are generally aligned to form a first retaining line 33 along second edge portion 20, as shown by a dashed line in FIG. 3. The selected or designed shape and dimensions of bearing surface 31 preferably establish area contact or line contact between first curved edge 25 and bearing surface 31. As shown in FIG. 2, when piping jacket 10 is in the closed position, first curved edge 25 contacts bearing surface 31 of projection 30. The frictional contact between first curved edge 25 and bearing surface 31 of each projection 30 retains first curved edge 25 along first retaining line 33, temporarily securing piping jacket 10 around the piping element until piping jacket 10 can be permanently fastened using a strap, a clamp or any other suitable conventional fastening means. Projections 30 may have different dimensions to form a sufficient bearing surface 31 to accommodate different required retaining strengths of piping jacket 10 of this invention.

Figure 3:
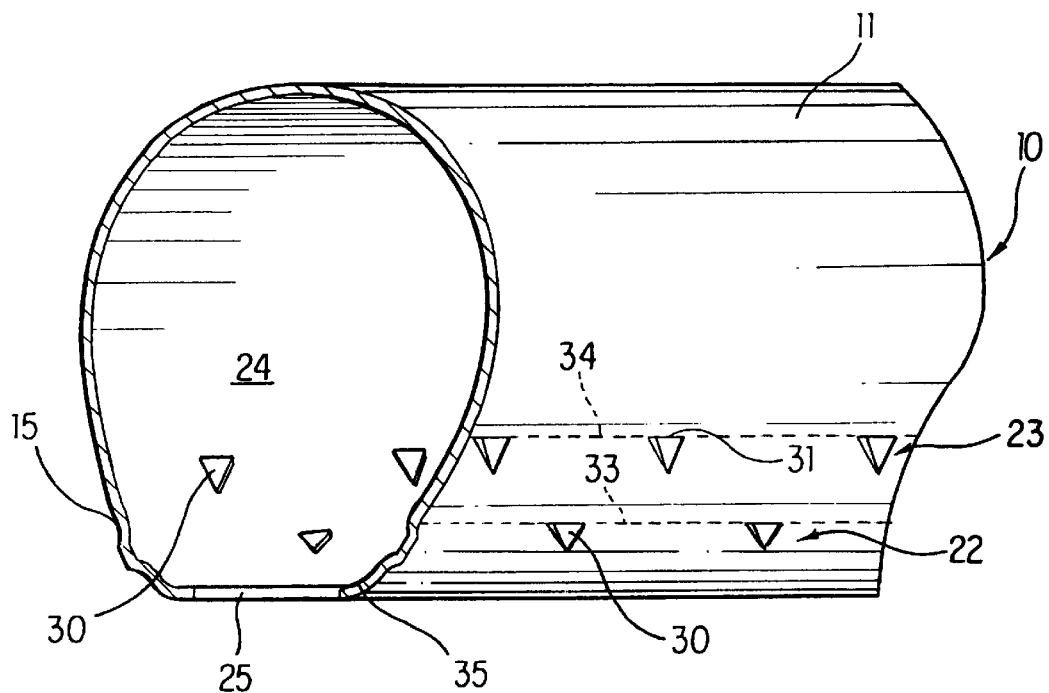
FIG. 3 is a perspective front view of a piping jacket having at least two axial rows of projections, according to one preferred embodiment of this invention.

It is apparent that projection 30 can have any other suitable two-dimensional shape within the plane that is generally parallel to outer surface 51. For example, projection 30 can have a rectangular shape, a polygonal shape, a circular shape or any other suitable shape that forms a desired bearing surface 31. The triangular shape, particularly with bearing surfaces 31 aligned to form first retaining line 33, such as shown in FIG. 3, more evenly distributes forces applied at bearing surface 31 through projection 30 along a length of second edge portion 20, more evenly than a rectangular shape. In certain uses that require relatively small retaining forces, the triangular shape or relatively linear bearing surface 31 on another suitably shaped projection 30 may not be as necessary as in uses that require relatively large retaining forces.

In another preferred embodiment according to this invention, second edge portion 20 may have or form a plurality of projections 30 aligned in at least two rows, as shown in FIG. 3. For example, a row 22 of projections 30 may be aligned so bearing surfaces 31 of each projection 30 form first retaining line 33 along second edge portion 20. Preferably, projections 30 of row 22 have a triangular or approximately triangular two-dimensional shape. However, projection 30 can be formed in any suitable shape, as previously discussed with respect to projection 30.

Similarly, a second row 23 of projections 30 may be aligned so bearing surfaces 31 of each projection 30 form a second retaining line 34 along second edge portion 20, as shown by a dashed line in FIG. 3. Projections 30 of second row 23 may be aligned circumferentially with projections 30 of first row 22 or may be offset with respect to projections 30 of first row 22, as shown in FIG. 3. Projections 30 of second row 23 may or may not be a different size from projections 30 of first row 22 and/or a different two-dimensional shape that forms suitable bearing surfaces 31.

As shown in FIG. 3, piping jacket 10 having a second edge portion 20 comprising rows 22 and 23 of projections 30 easily accommodates piping elements of different outside diameters or circumferences. Thus, the same piping jacket can be designed to economically accommodate two or more differently sized piping elements. Row 22 can accommodate a piping element having a relatively larger outer diameter. If different sizes of opening 24 are required to properly cover a piping element, first edge portion 15 is forced toward second edge portion 20 so that first curved edge 25 contacts and overlaps second edge portion 20 and projections 30 of second row 23 interfere with first curved edge 25. The frictional contact of first curved edge 25 with bearing surfaces 31 of projections 30, aligned along second retaining line 34, temporarily secures piping jacket 10 around the piping element. Piping jacket 10 can be permanently fastened around the piping element using a strap, a clamp or other suitable fastening means known to those skilled in the art.

Figure 4:
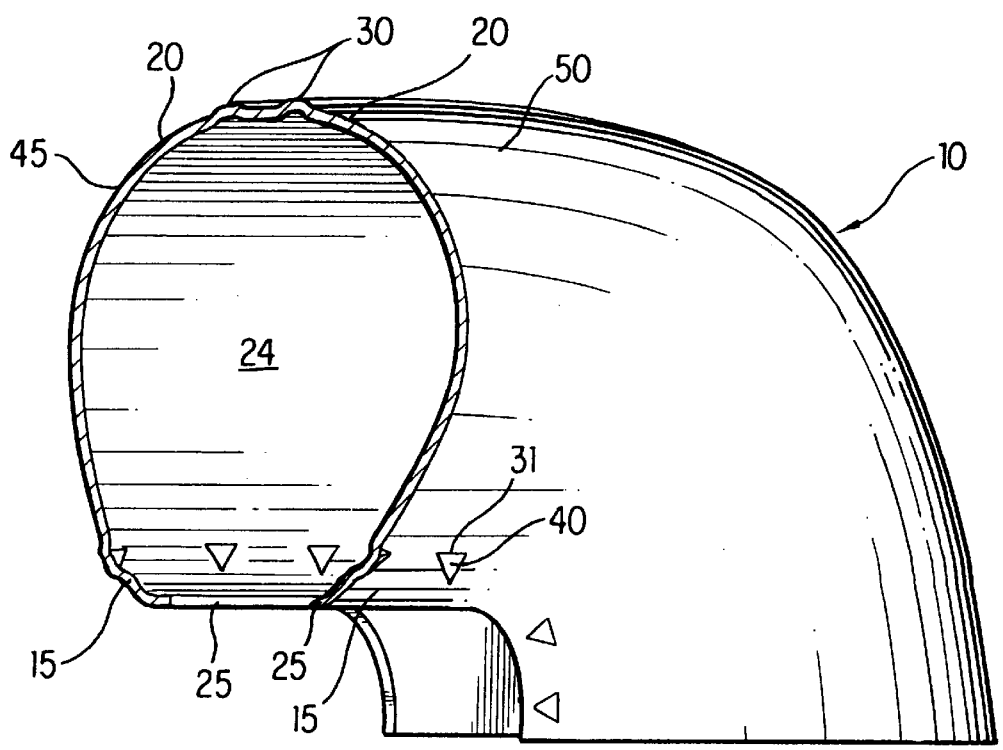
FIG. 4 is perspective front view of a piping jacket having two separate body sections, according to one preferred embodiment of this invention.

In another preferred embodiment of this invention, body 11 comprises two separate sections, a first body section 45 and a second body section 50. As shown in FIG. 4, first body section 45 and second body section 50 preferably, but not necessarily, have a general semi-circular or arcuate cross sectional shape. Each body section 45 and 50 comprises first edge portion 15 and second edge portion 20. At least a portion of each first edge portion 15 of body sections 45 and 50 has a first curved edge 25 which preferably but not necessarily curves radially inward. Second edge portion 20 of each body section 45 and 50 has or forms a plurality of projections 30 which preferably extend radially outward. In a preferred embodiment where one or more projections 30 extend radially inward, one or more corresponding first curved edges 25 curve radially outward. First curved edge 25 and/or projections 30 stiffen and thus increase the longitudinal or axial strength of piping jacket 10.

As shown in FIG. 4, in one preferred embodiment, each first edge portion 15 of body section 45 and 50 further comprises a plurality of second projections 40, which preferably extend radially outward and may or may not be similar to projections 30. At least a portion of each second edge portion 20 of body sections 45 and 50 further comprises a second curved edge 35 which preferably curves radially inward.

In such an embodiment, body section 45 and body section 50 are positioned around a piping element so that first edge portion 15 of body section 45 opposes first edge portion 15 of body section 50. Similarly, second edge portion 20 of body section 45 opposes second edge portion 20 of body section 50. In such a position, body 11 forms opening 24, as shown in FIG. 4.

Figure 5:
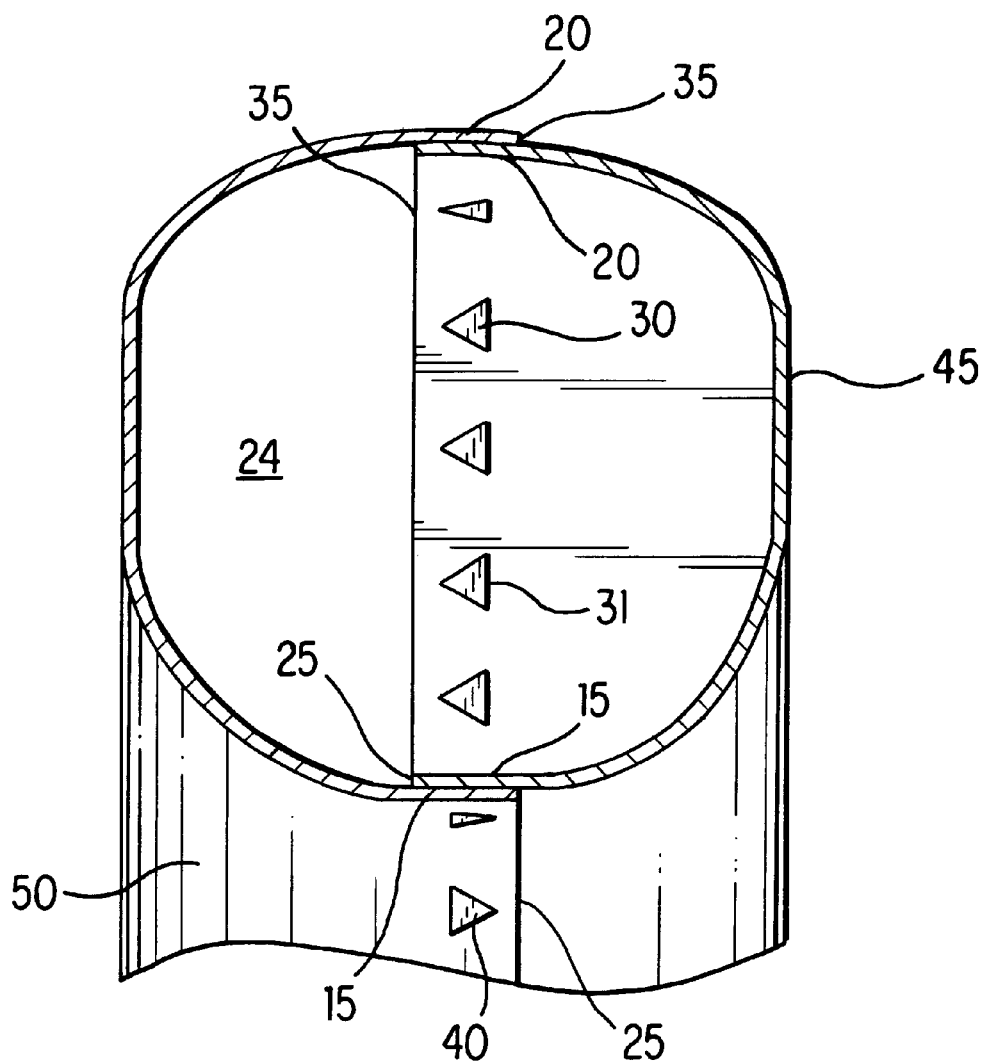
FIG. 5 is a cross-sectional side view of a piping jacket having two separate body sections in a closed position, according to one preferred embodiment of this invention.

As shown in FIG. 5, in the closed position, first edge portion 15 of body section 45 is positioned radially inward from and overlaps first edge portion 15 of body section 50 and second edge portion 20 of body section 45 is positioned radially inward from and overlaps second edge portion 20 of body section 50 to form opening 24. By pushing or otherwise forcing body section 45 and body section 50 together or towards each other, second projections 40 along first edge portion 15 of body section 45 interfere with the complementary first curved edge 25 of first edge portion 15 of body section 50. Similarly, projections 30 along second edge portion 20 of body section 45 interfere with the complementary second curved edge 35 of second curved portion 20 of body section 50. Body sections 45 and 50 are retained around the piping element in a temporary but secure position until piping jacket 10 is permanently secured using a strap, clamp or other fastening device known to those skilled in the art.

Alternatively, first edge portion 15 of body section 50 can be positioned radially inward and overlap first edge portion 15 of body section 45 and second edge portion 20 of body section 50 can be positioned radially inward from and overlap second edge portion 20 of body section 45 to form opening 24. By pushing or otherwise forcing body section 45 and body section 50 together or towards each other, second projections 40 along first edge portion 15 of body section 50 interfere with the complementary first curved edge 25 of first edge portion 15 of body section 45. Similarly, projections 30 along second edge portion 20 of body section 50 interfere with the complementary second curved edge 35 of second curved portion 20 of body section 45.

In another preferred embodiment, second edge portion 20 of each body section 45 and 50 has or forms a plurality of projections 30, a portion of which extend radially inward and another portion of which extend radially outward. Similarly, first edge portion 15 of each body section 45 and 50 has or forms a plurality of second projections 40, a portion of which extend radially inward and another portion of which extend radially outward. In such an embodiment, projections 30 and second projections 40, extending radially inward, interfere with corresponding second curved edge 35 and first curved edge 25, respectively.

While in the foregoing specification this invention has been described in relation to certain preferred embodiments, and many details are set forth for purpose of illustration, it will be apparent to those skilled in the art that this invention is susceptible to additional embodiments and that certain of the details described in this specification and in the claims can be varied considerably without departing from the basic principles of this invention.

We claim:

1. A piping jacket comprising:
a body having a first edge portion and an opposing second edge portion, the body moveable between an open position and a closed position, in the open position the first edge portion separated from the second edge portion, at least a portion of the first edge portion having a continuous first curved edge, the continuous first curved edge curving radially inward with respect to the body and interfering with a plurality of projections on the second edge portion to retain the continuous first curved edge on a retaining line formed by bearing surfaces of the projections when in the closed position.

2. A piping jacket according to claim 1 wherein the first edge portion and the second edge portion have a general arcuate cross sectional shape.

3. A piping jacket according to claim 1 wherein at least a portion of the second edge portion has a continuous second curved edge.

4. A piping jacket according to claim 1 wherein the first edge portion further comprises a plurality of second projections.

5. A piping jacket according to claim 1 wherein the body comprises a first body section and a second body section each having the first edge portion and the second edge portion.

6. A piping jacket according to claim 1 wherein the projections of the second edge portion project radially outward.

7. A piping jacket according to claim 1 wherein the projections are evenly spaced in an axial direction of the piping jacket.

8. A piping jacket according to claim 1 wherein the bearing surfaces are aligned.

9. A piping jacket according to claim 1 wherein each of the projections has a generally triangular shape within a plane generally parallel to outer surface of the body.

10. A piping jacket according to claim 1 wherein the body is non-perforated near the projections.

11. A piping jacket according to claim 1 wherein the projections are formed in at least two rows.

12. A piping jacket according to claim 1 wherein the projections are formed in a plurality of rows offset with respect to each other.

13. A piping jacket according to claim 1 wherein the projections are differently sized.

14. A piping jacket comprising:
   a body having a first body section and a second body section, each has a first edge portion and a second edge portion;
   at least a portion of the first edge portion of the first body section and at least a portion of the second edge portion of the first body section each having a continuous curved edge curving radially inward with respect to the body;
   the first edge portion of the second body section having a plurality of first projections interfering with the continuous curved edge of the first edge portion of the first body section to retain the continuous curved edge on a first retaining line formed by bearing surfaces of the first projections when the piping jacket is in a closed position; and
   the second edge portion of the second body section having a plurality of second projections interfering with the continuous curved edge of the second edge portion of the first body section to retain the continuous curved edge on a second retaining line formed by bearing surfaces of the second projections when in the closed position.

15. A piping jacket according to claim 14 wherein the first edge portion and the second edge portion of the first body section have the projections.

16. A piping jacket according to claim 15 wherein at least a portion of the first edge portion and at least a portion of the second edge portion of the second body section each has a curved edge.

17. A piping jacket according to claim 1 wherein in the closed position the continuous first curved edge contacts the bearing surface of each projection to retain the continuous first curved edge along the retaining line.

18. A piping jacket comprising:
   a body having a first edge portion and an opposing second edge portion, at least a portion of the first edge portion having a continuous first curved edge curving radially inward with respect to the body and the second edge portion having a plurality of triangular projections each having a bearing surface, the bearing surface of each triangular projection of the plurality of triangular projections aligned to form a retaining line,
   the body moveable between an open position and a closed position, wherein in the open position the first edge portion is separated from the second edge portion, and wherein in the closed position the continuous first curved edge contacts the bearing surface to retain the continuous first curved edge along the retaining line.

* * * * *